United States Patent [19]

Alderman et al.

[11] 4,179,016

[45] Dec. 18, 1979

[54] FINAL DRIVE GEARING WITH BRAKE

[75] Inventors: William Alderman; Eric C. Hodgson, both of Huddersfield, England

[73] Assignee: David Brown Tractors Limited, Huddersfield, England

[21] Appl. No.: 762,300

[22] Filed: Jan. 25, 1977

[30] Foreign Application Priority Data

Feb. 27, 1976 [GB] United Kingdom .............. 7759/76

[51] Int. Cl.² ............................................. B60K 29/02
[52] U.S. Cl. .................................. 192/4 A; 188/71.4; 192/93 A; 74/801
[58] Field of Search ................... 188/71.4; 192/93 A, 192/4 A, 4 R, 4 C; 74/411.5

[56] References Cited

U.S. PATENT DOCUMENTS

| | | | |
|---|---|---|---|
| 2,387,039 | 10/1945 | Parrett | 188/71.4 |
| 2,874,807 | 2/1959 | Hahn | 188/71.4 |
| 2,904,145 | 9/1959 | Sheppard | 192/4 A |
| 3,400,601 | 9/1968 | Ruhl et al. | 192/4 C X |
| 3,834,498 | 9/1974 | Ashfield | 192/4 A |
| 3,842,948 | 10/1974 | Frederick | 188/71.4 |

FOREIGN PATENT DOCUMENTS 1277345 6/1972 United Kingdom .................... 188/71.4

Primary Examiner—Benjamin W. Wyche
Attorney, Agent, or Firm—Norris & Bateman

[57] ABSTRACT

A final drive assembly for an agricultural tractor has a casing in which are journalled the outer end of a half-shaft and, parallel to the half-shaft, a final drive shaft. The two shafts are driveably interconnected by fixed ratio speed reduction gearing lubricated by mineral oil contained in the casing. A multi-disc brake can frictionally interconnect the half-shaft and the casing, and is operated via a linkage by a hydraulic slave cylinder housed within the casing and preferably actuated by mineral oil to avoid contaminating the lubricating oil in the event of any leakage from the cylinder.

9 Claims, 3 Drawing Figures

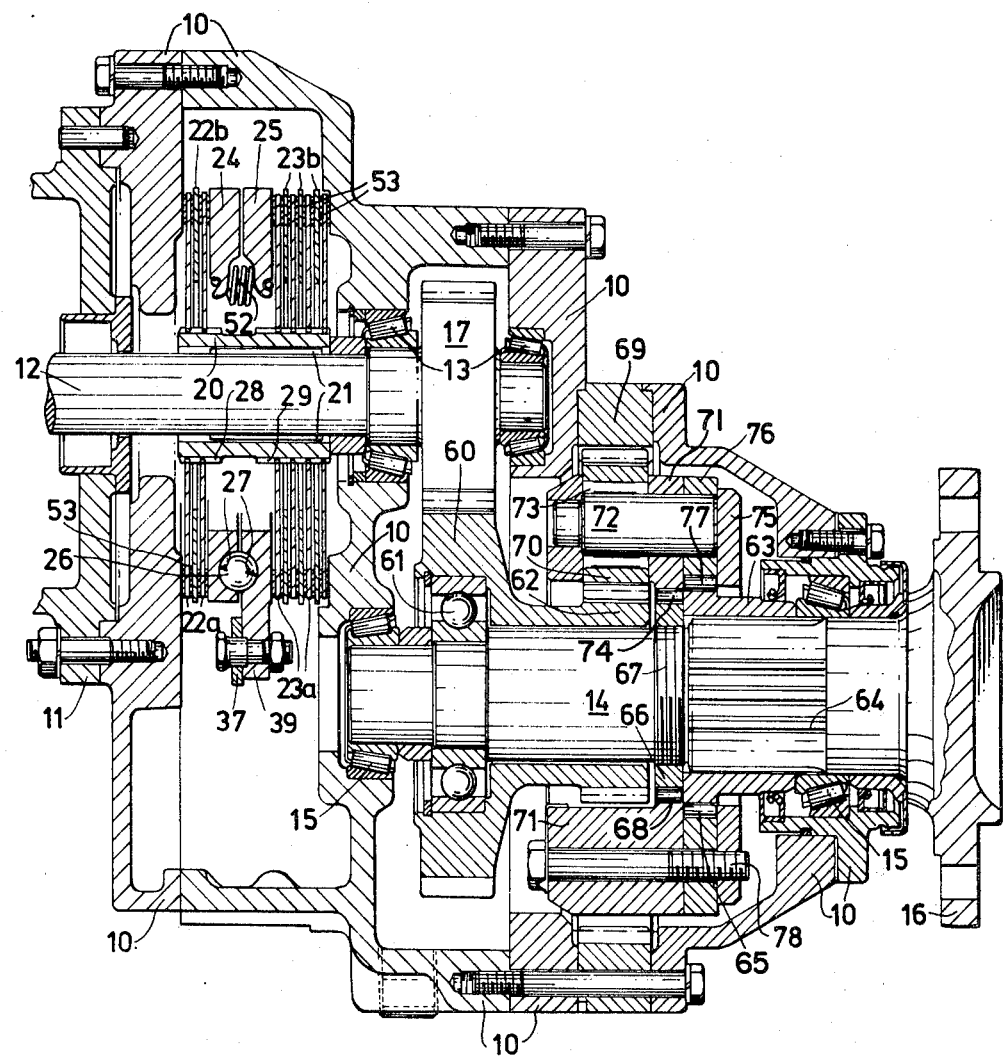
—FIG.3.—

FINAL DRIVE GEARING WITH BRAKE

BACKGROUND OF INVENTION

The invention relates to a final drive assembly, for an agricultural tractor or the like, including a brake.

Hitherto, actuation of the brake from an external point has necessitated a complex mechanical linkage with associated problems regarding sealing the egress of the linkage, access for adjustment of the brake, and large cumulative wear of the linkage joints.

The object of the invention is to avoid or minimise these problems.

SUMMARY OF INVENTION

According to the invention, a final drive assembly, for an agricultural tractor or the like, comprises a casing in which there are journalled a final drive shaft and the outer end of a half-shaft, speed reduction gearing housed within the casing and driveably interconnecting the two shafts, a brake mounted on one of said shafts within the casing for establishing a frictional connection between said one shaft and the casing, and a hydraulic cylinder housed within the casing for operating the brake.

BRIEF DESCRIPTION OF DRAWINGS

The invention will now be described, by way of example, with reference to the accompanying drawings of which:

FIG. 3 is a section corresponding to FIG. 1 of another embodiment of final drive assembly

DESCRIPTION OF PREFERRED EMBODIMENT

Figure 1:
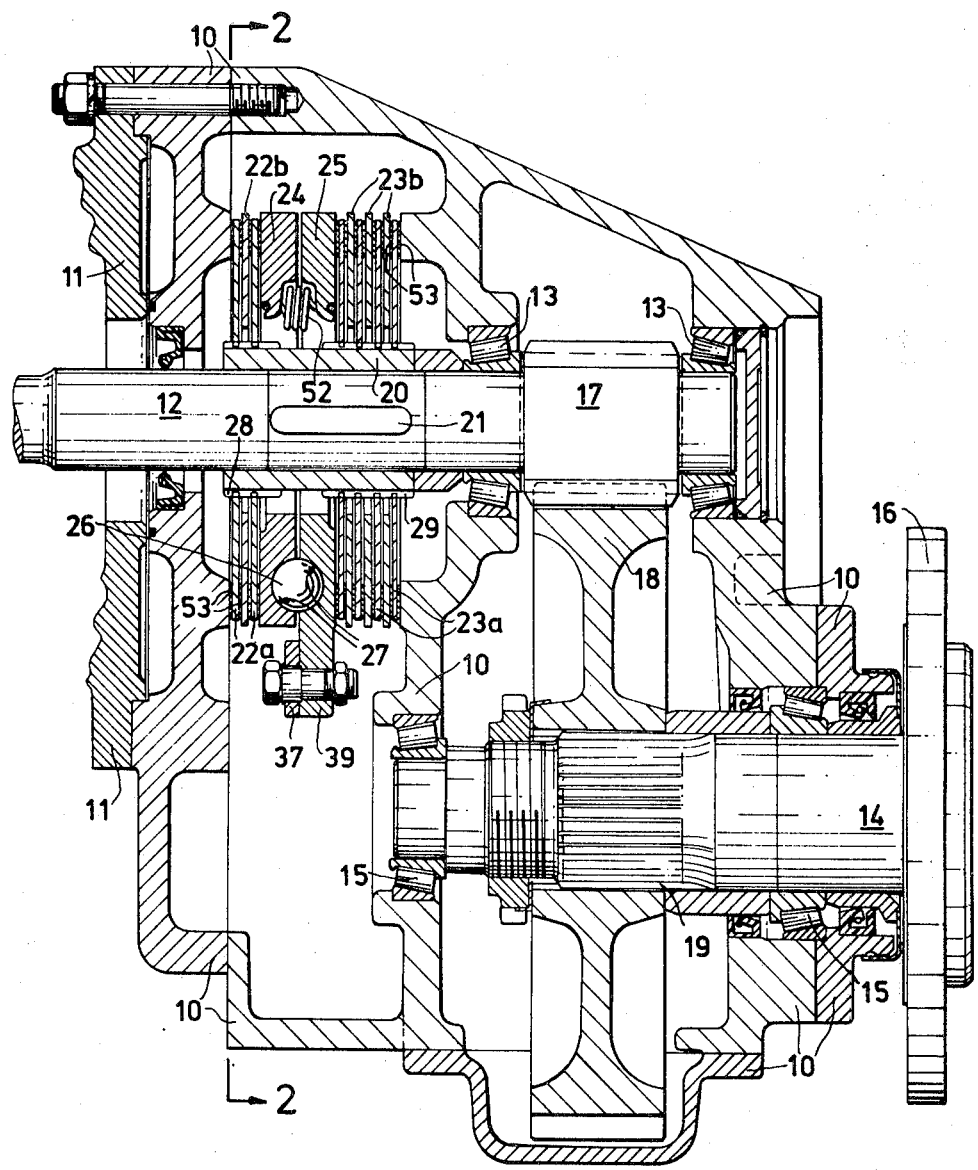
FIG. 1 is a section on the centre-line of one embodiment of final drive assembly.
Figure 2:
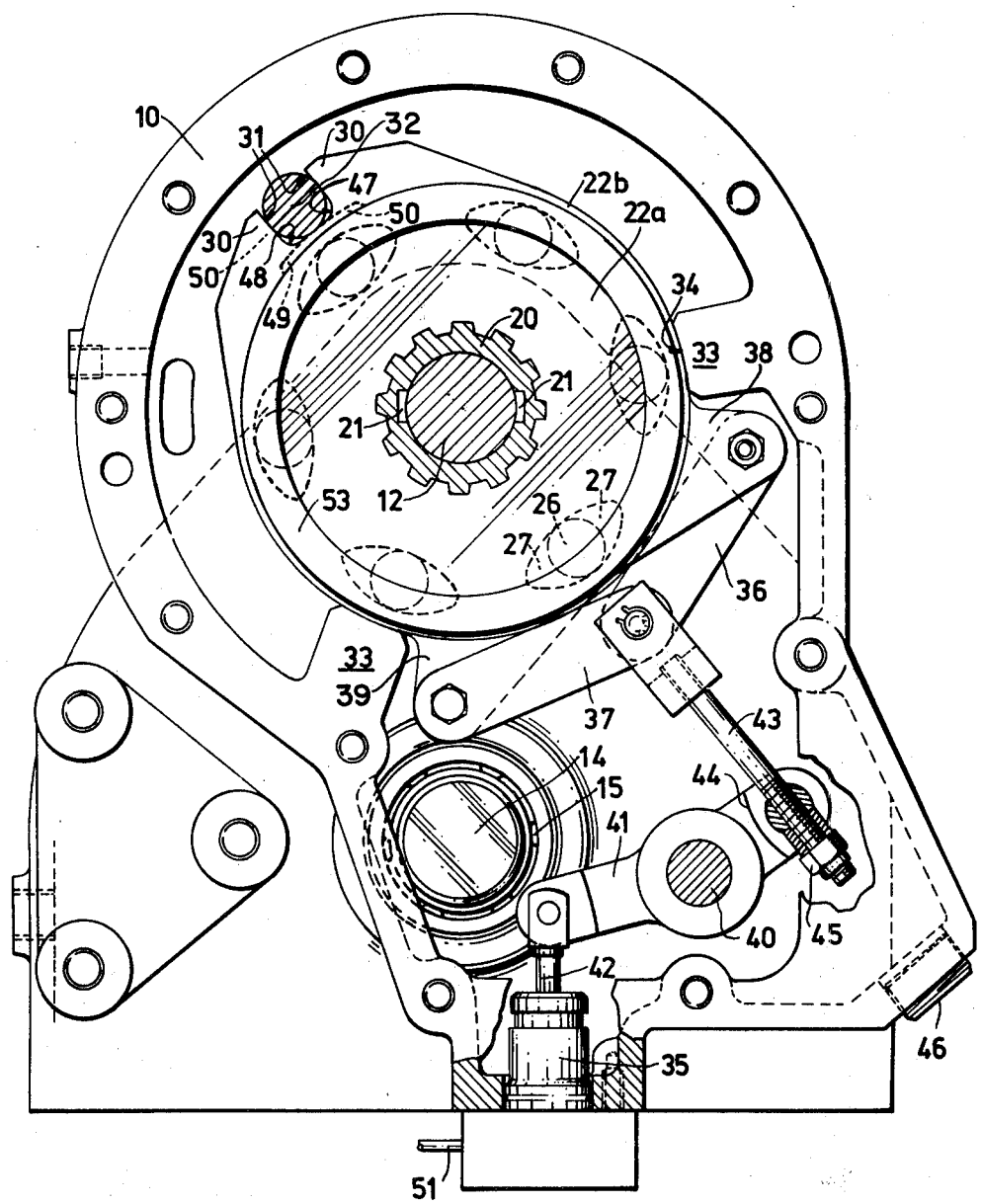
FIG. 2 is a section on the line 2—2 in FIG. 1.

Referring now to FIGS. 1 and 2, one embodiment of a final drive assembly, for an agricultural tractor, comprises a casing 10 adapted to be rigidly secured with an oil-tight joint to the tractor's rear axle and differential gear case 11. Journalled in the casing 10 are the outer end of a half-shaft 12 carried by bearings 13, the inner end of which is adapted to extend through the case 11 into driven engagement with the differential gear (not shown), and a final drive shaft 14 carried by bearings 15 which is provided with a flange 16 to which a rear driving wheel can be rigidly secured and is disposed below and parallel to the half-shaft 12. The two shafts 12 and 14 are driveably interconnected by speed reduction gearing housed within the casing 10 and comprising a pinion 17 integral with the half-shaft 12 and meshing with a gear 18 rigidly secured on splines 19 on the final drive shaft 14. A multi-disc brake mounted within the casing 10 on a hub 20 rigidly secured by two diametrically-opposed keys 21 on the half-shaft 12 is of the type known per se which has two axially-spaced sets 22, 23 of interleaved friction discs between which there are disposed two pressure plates 24, 25, balls 26 trapped in complementary pairs of circumferentially ramped recesses 27 in the adjacent faces of the plates 24, 25, means for effecting relative angular movement of said plates so as to cause the balls 26 to force them apart to apply the brake, and resilient means consisting of a plurality of helical tension springs 52 for urging said plates together to release the brake. Those friction discs of each set which are associated with the half-shaft 12 are indicated by the suffix a, are provided with annular brake linings 53, and are driveably mounted on respective splined zones 28, 29 on the hub 20; while those friction discs of each set which are associated with the casing 10 are indicated by the suffix b and are each provided with a peripheral projection 30 having a notch 31 in which there engages a reaction pin 32 rigidly secured to the casing 10 for holding the last-mentioned discs against rotation. Formed integrally within the casing 10 are two radially-inwardly projecting supports 33 with concave arcuate faces 34 for loosely locating the friction discs 22b, 23b and the pressure plates 24, 25. The means for effecting relative angular movement of the pressure plates 24, 25 comprise a simple linkage housed entirely within the casing 10 and operated by a hydraulic slave cylinder 35 also housed within said casing. Thus the linkage has no point of egress from the casing 10 which would require sealing. Said linkage consists of two links 36, 37 each of which is pivotally connected at one end to one of two lugs 38, 39 projecting from the respective peripheries of the pressure plates 24, 25 and at the other end to the other link to form a caliper, a bell-crank lever fulcrummed at 40 on the casing 10, one arm 41 of which lever is pivotally connected to a piston rod 42 of the hydraulic slave cylinder 35, and a brake rod 43 pivotally connecting the other arm 44 of said lever to the point of interconnection of the two links 36, 37. There are accordingly relatively few joints in the linkage so that cumulative wear should not become troublesomely large. The effective length of the rod 43 is adjustable by means of a self-locking nut 45 in order to adjust the brake, and the nut 45 is readily accessible by removing from the casing 10 a screwed plug 46 aligned with the rod 43. The reaction pin 32 is diametrically opposite the rod 43, and is engageable on one side by a single radial surface 47 on a peripheral projection 49 formed on the pressure plate 24 and on the other side by a single radial surface 48 on a peripheral projection 50 formed on the pressure plate 25. Each of the radial surfaces 47, 48 is thus moveable away from and back to the associated side of the pin 32, so that the two pressure plates 24, 25 are relatively moveable angularly in opposite directions about the axis of the half-shaft 12 to cause the balls 26 to force the plates apart to apply the brake as hereinbefore described. The speed reduction gearing 17, 18 is lubricated by conventional mineral oil contained within the casing 10. The hydraulic slave cylinder 35 is supplied with oil under pressure, when braking is required, by a pedal-operated hydraulic master cylinder (not shown) through a pipe 51 connected to an end of the slave cylinder 35 which is exposed to the exterior of the casing 10. Conventionally, the braking system would use so-called vegetable oil, and this practice could be continued if an effective sealing boot were fitted in known manner between the slave cylinder 35 and its piston rod 42, but in the event of leakage past said boot the vegetable oil would contaminate the mineral oil in the casing 10. It is therefore preferred to take the unusual but advantageous step of using mineral oil in the braking system, and consequently no such sealing boot is necessary although it may be retained if desired.

Referring now to FIG. 3, another embodiment of a final drive assembly, for an agricultural tractor, is substantially identical to that of FIGS. 1 and 2 in so far as the brake and its actuating means are concerned, but employs a different form of speed reduction gearing. Those components of the FIG. 3 embodiment which have equivalents in the embodiment of FIGS. 1 and 2 have therefore been indicated by the same reference numerals. The speed reduction gearing of FIG. 3 comprises a pinion 17 integral with the half-shaft 12, a gear 60 meshing with the pinion 17 and journalled on a bearing 61 on the final drive shaft 14, a sun gear 62 integral with the gear 60, a sleeve 63 rigidly secured on splines 64 on the final drive shaft 14 and having a ring of external gear teeth 65, a lock-nut 66, for the sleeve 63, which engages with a screw thread 67 formed on the final drive shaft 14 and has a ring of external gear teeth 68, an annular gear 69 rigidly secured to the casing 10, a set of three planet pinions 70 each meshing with the sun gear 62 and with the annular gear 69, and a floating planet carrier driveably connected to the sleeve 63. The planet carrier comprises an annular body 71 in which there are disposed spindles 72 on which the respective planet pinions 70 are journalled on needle bearings 73, said body having a ring of internal gear teeth 74 which mesh with the teeth 68 with substantial backlash; an annular back-plate 75 the internal diameter of which is less than the tip diameter of the external teeth 65; an annular disc 76 having a ring of internal gear teeth 77 the tip diameter of which is greater than the tip diameter of the external teeth 68 and which mesh with the teeth 65 with substantial backlash; and set-screws 78 which clamp the disc 76 between the body 71 and the back-plate 75. The teeth 65 are of such axial length that they fit with axial clearance between the body 71 and the back-plate 75. The floating planet carrier minimises inequalities in the torque values transmitted by the respective planet pinions 70, and has secure assembly means and minimal axial length.

We claim:

1. A final drive assembly, for an agricultural tractor or the like, comprising a casing in which there are journalled a final drive shaft and the outer end of a half-shaft, speed reduction gearing housed within the casing and driveably interconnecting the two shafts, a brake mounted on one of said shafts within the casing for establishing a frictional connection between said one shaft and the casing, and means for operating the brake comprising a hydraulic cylinder housed within the casing and having a piston rod extending within the casing, a bell crank lever fulcrumed within the casing and having one arm pivotally connected to said piston rod, and a rod within said casing pivotally connected to the other arm of said bell crank lever and having an operative connection with said brake.

2. A final drive assembly according to claim 1, wherein the brake is mounted on the half-shaft.

3. A final drive assembly according to claim 1, wherein the two shafts are parallel to one another and the reduction gearing comprises a pinion integral with the half-shaft and meshing with a wheel rigidly secured on the final drive shaft.

4. A final drive assembly according to claim 1, wherein the two shafts are parallel to one another and the reduction gearing comprises a pinion integral with the half-shaft, a wheel meshing with the pinion and journalled on the final drive shaft, a sun gear integral with the wheel, a set of planet pinions meshing with the sun gear and with an annular gear rigidly secured to the casing, and a planet carrier driveably connected to the final drive shaft.

5. A final drive assembly according to claim 4, wherein the planet carrier is driveably connected floatingly to the final drive shaft.

6. A final drive assembly according to claim 1, wherein the brake is a multi-disc brake having two axially-spaced sets of interleaved friction discs between which there are disposed two pressure plates, and balls are trapped in complementary pairs of circumferentially-ramped recesses in the adjacent faces of said plates, and the operative connection between said brake rod and said brake comprises linkage means housed within the casing and constructed and arranged for effecting relative angular movement of the plates so as to cause the balls to force them apart to apply the brake upon operation of the brake rod by said hydraulic cylinder, and resilient means for urging the plates together to release the brake.

7. A final drive assembly as defined in claim 1, wherein means is provided for selectively adjusting the length of said brake rod for effecting brake adjustment.

8. A final drive assembly, for an agricultural tractor or the like, comprising a casing in which there are journalled a final drive shaft and the outer end of a half-shaft, speed reduction gearing housed within the casing and driveably interconnecting the two shafts, a brake mounted on one of said shafts within the casing for establishing a frictional connection between said one shaft and the casing, and a hydraulic cylinder housed within the casing for operating the brake; said brake being a multi-disc brake having two axially-spaced sets of interleaved friction discs between which there are disposed two pressure plates, balls trapped in complementary pairs of circumferentially-ramped recesses in the adjacent faces of said plates, linkage means housed within the casing and operated by the hydraulic cylinder for effecting relative angular movement of the plates so as to cause the balls to force them apart to apply the brake, and resilient means for urging the plates together to release the brake; and said linkage means comprising two links each of which is pivotally connected at one end to one of the pressure plates and at the other end to the other link to form a caliper, a bell-crank lever one arm of which is pivotally connected to the piston rod of the hydraulic cylinder, and a rod pivotally connecting the other arm of said lever to the point of interconnection of the two links.

9. A final drive assembly according to claim 8, wherein the effective length of the rod is adjustable in order to adjust the brake.

* * * * *